(12) United States Patent
Utykanski et al.

(10) Patent No.: US 10,747,973 B2
(45) Date of Patent: Aug. 18, 2020

(54) STAND THAT ENABLES A MOBILE DEVICE TO READ BARCODES IN PRESENTATION MODE

(71) Applicant: The Code Corporation, Draper, UT (US)

(72) Inventors: Phil Utykanski, Saratoga Springs, UT (US); John Deal, Springfield, PA (US)

(73) Assignee: The Code Corporation, Murray, UT (US)

( * ) Notice: Subject to any disclaimer, the term of this patent is extended or adjusted under 35 U.S.C. 154(b) by 0 days.

(21) Appl. No.: 16/212,392

(22) Filed: Dec. 6, 2018

(65) Prior Publication Data

US 2020/0184164 A1 Jun. 11, 2020

(51) Int. Cl.
*G06K 7/10* (2006.01)

(52) U.S. Cl.
CPC ..... *G06K 7/10821* (2013.01); *G06K 7/10722* (2013.01)

(58) Field of Classification Search
USPC .......... 235/462.14, 462.45–462.49, 235/472.01–472.03, 462.41
See application file for complete search history.

(56) References Cited

U.S. PATENT DOCUMENTS

| | | | | |
|---|---|---|---|---|
| 8,511,626 | B1 * | 8/2013 | Trinh ............... | B60K 35/00 248/206.2 |
| 8,714,453 | B2 * | 5/2014 | Powell ............ | G06K 7/109 235/462.14 |
| 2006/0091214 | A1 * | 5/2006 | Hyde ............... | G06K 7/10722 235/454 |
| 2009/0093274 | A1 * | 4/2009 | Yamamoto ...... | G02B 13/0015 455/566 |
| 2010/0060532 | A1 * | 3/2010 | Kuang ............. | H01Q 1/084 343/713 |
| 2014/0176690 | A1 * | 6/2014 | Hamel ............. | G02B 27/026 348/63 |
| 2018/0210323 | A1 * | 7/2018 | Ahn ................. | G02B 6/0018 |
| 2018/0330135 | A1 * | 11/2018 | Suman ............ | G06K 19/14 |

* cited by examiner

*Primary Examiner* — Tuyen K Vo
(74) *Attorney, Agent, or Firm* — Timothy P. O'Hagan; Ray Quinney & Nebeker

(57) ABSTRACT

A presentation stand for enabling a mobile device to read barcodes in presentation mode includes a cradle portion that is connected to the base portion. The cradle portion is configured to hold the mobile device in a position for reading a barcode. A shield portion is attached to the cradle portion and configured to modify a field of view of a camera of the mobile device. The shield portion is also configured to modify a field of illumination of an illumination source of the mobile device. The shield portion includes a camera optic system that is at least partially aligned with the camera of the mobile device when the mobile device is held in the cradle portion. The shield portion also includes an illumination optic system that is at least partially aligned with the illumination source of the mobile device when the mobile device is held in the cradle portion.

20 Claims, 9 Drawing Sheets

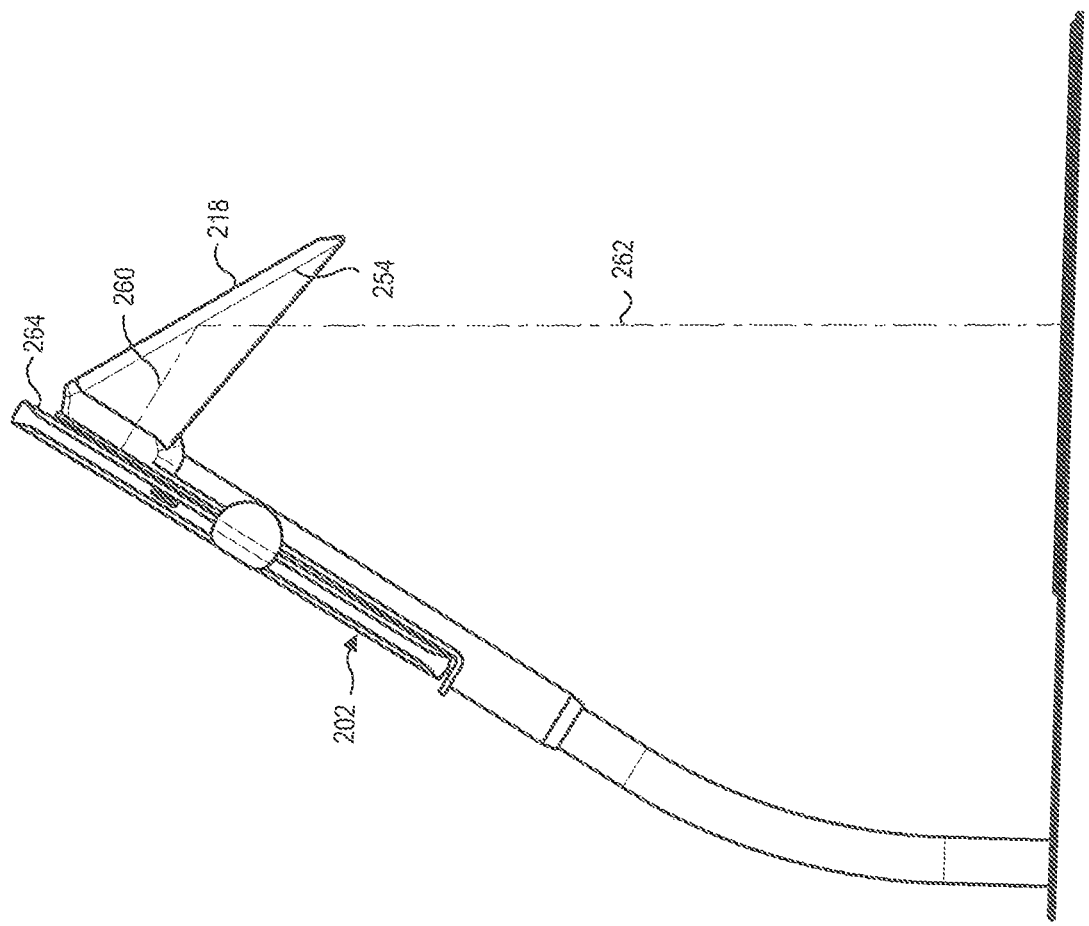

STAND THAT ENABLES A MOBILE DEVICE TO READ BARCODES IN PRESENTATION MODE

BACKGROUND

A barcode is an optical machine-readable representation of information. Devices for identifying or extracting information from barcodes are often referred to as barcode readers or barcode reading devices. Image-based barcode readers operate by capturing and decoding images of barcodes. In typical operation, one or more light sources are activated to illuminate a region of space that includes a barcode. Light is reflected from the barcode toward the barcode reader. One or more lenses within the barcode reader focus an image of the barcode onto an image sensor, which is a two-dimensional array of photosensors (i.e., detectors that are sensitive to electromagnetic radiation). The photosensors are read electronically to provide a two-dimensional array of image data corresponding to the barcode. A decoder then processes the image data and extracts the information contained in the barcode.

Some barcode readers are capable of operating in either a "hand-held mode" or a "presentation mode." When a barcode reader is operating in hand-held mode, a user holds the reader in his/her hand, manually positions the reader so that a barcode is located within the reader's field of view, and activates a trigger located on the reader. The barcode is read in response to activation of the trigger. In contrast, when a barcode reader is operating in presentation mode, an item bearing a barcode is presented to the reader rather than the reader being presented to the barcode. In presentation mode, barcodes are read automatically when they are detected within the reader's field of view. When a reader is operating in presentation mode, it is typically desirable for the reader to be held in a fixed position without the user having to hold the reader in place. A stand may be utilized for this purpose.

Mobile devices (e.g., smartphones, tablet computers) are in widespread use today, most often in connection with entertainment, communications and office productivity. Many mobile devices include a camera, and applications have been developed for using the camera to read barcodes.

SUMMARY

In accordance with one aspect of the present disclosure, a presentation stand is disclosed for enabling a mobile device to read barcodes in presentation mode. The mobile device may include a camera and a first illumination source. The presentation stand may include a base portion, a cradle portion connected to the base portion, and a shield portion attached to the cradle portion. The cradle portion may be configured to hold the mobile device in a position for reading a barcode. The shield portion may be configured to modify a field of view of the camera and a field of illumination of the first illumination source. The shield portion may include a camera optic system that is at least partially aligned with the camera of the mobile device when the mobile device is held in the cradle portion. The shield portion may include an illumination optic system that is at least partially aligned with the first illumination source of the mobile device when the mobile device is held in the cradle portion.

The camera and the camera optic system may define a barcode reading lens system. The barcode reading lens system may have a system field of view that is different from the field of view of the camera. The illumination optic system and the first illumination source of the mobile device may define an exposure illumination system. The exposure illumination system may emit a system illumination field with a system angular size that is different from an angular size of a first illumination field emitted by the first illumination source.

The shield portion may further include one or more reflective surfaces. The one or more reflective surfaces may be configured to redirect an optical pathway of the system field of view from a first direction that is perpendicular to a back surface of the mobile device to a second direction that intersects with a region of space where the barcode is located. The one or more reflective surfaces may also be configured to redirect the system illumination field from the first direction to the second direction.

The camera and the camera optic system may define a barcode reading lens system. The barcode reading lens system may have a system field of view that is different from the field of view of the camera. The illumination optic system may include a target generating structure that is at least partially aligned with the first illumination source when the mobile device is held in the cradle portion of the presentation stand. The target generating structure may be configured to modify a first illumination field emitted by the first illumination source to generate a targeting pattern.

The shield portion may further include one or more reflective surfaces. The one or more reflective surfaces may be configured to redirect an optical pathway of the system field of view from a first direction that is perpendicular to a back surface of the mobile device to a second direction that intersects with a region of space where the barcode is located. The one or more reflective surfaces may also be configured to redirect the targeting pattern from the first direction to the second direction.

The camera and the camera optic system may define a barcode reading lens system. The barcode reading lens system may have a system field of view that is different from the field of view of the camera. The illumination optic system may include at least one illumination optic system lens. The at least one illumination optic system lens and the first illumination source of the mobile device may define an exposure illumination system. The exposure illumination system may emit a system illumination field with a system angular size that is different from an angular size of a first illumination field emitted by the first illumination source. The mobile device may further include a second illumination source. The illumination optic system may further include a target generating structure that is at least partially aligned with the second illumination source when the mobile device is held in the cradle portion of the presentation stand. The target generating structure may be configured to modify a second illumination field emitted by the second illumination source to generate a targeting pattern.

The shield portion may further include one or more reflective surfaces. The one or more reflective surfaces may be configured to redirect an optical pathway of the system field of view from a first direction that is perpendicular to a back surface of the mobile device to a second direction that intersects with a region of space where the barcode is located, redirect the system illumination field from the first direction to the second direction, and redirect the targeting pattern from the first direction to the second direction.

The shield portion may include a first chamber and a second chamber. The camera optic system may be housed in the first chamber. The illumination optic system may be housed in the second chamber. The first chamber may be optically isolated from the second chamber.

A first connector may be configured to be connected to the mobile device. A second connector may be configured to be connected to a power source. A cable may connect the first connector to the second connector.

In accordance with another aspect of the present disclosure, a presentation stand is disclosed for enabling a mobile device to read barcodes in presentation mode. The mobile device may include a camera and a first illumination source. The camera may include a camera lens. The presentation stand may include a base portion configured for placement on a surface, a cradle portion connected to the base portion, a shield portion attached to the cradle portion, a camera optic system within the shield portion, and an illumination optic system within the shield portion. The cradle portion may be configured to hold the mobile device in a position for reading a barcode. The camera optic system may include at least one camera optic system lens that is at least partially aligned with the camera lens when the mobile device is held in the cradle portion of the presentation stand. The at least one camera optic system lens may be configured to modify a field of view of the camera lens to provide a system field of view that is different in angular size from the field of view of the camera lens. The illumination optic system may be at least partially aligned with the first illumination source of the mobile device when the mobile device is held in the cradle portion.

The illumination optic system may include at least one illumination optic system lens that is at least partially aligned with the first illumination source of the mobile device when the mobile device is held in the cradle portion of the presentation stand. The at least one illumination optic system lens may be configured to modify a first illumination field emitted by the first illumination source to provide a system illumination field with a system angular size that is different from an angular size of the first illumination field. The shield portion further may include one or more reflective surfaces. The one or more reflective surfaces may be configured to redirect an optical pathway of the system field of view from a first direction that is perpendicular to the back surface of the mobile device to a second direction that intersects with a region of space where the barcode is located. The one or more reflective surfaces may also be configured to redirect the system illumination field from the first direction to the second direction.

The illumination optic system may include a target generating structure that is configured to shape a first illumination field emitted by the first illumination source into a targeting pattern when the mobile device is held in the cradle portion of the presentation stand. The shield portion may further include one or more reflective surfaces. The one or more reflective surfaces may be configured to redirect an optical pathway of the system field of view from a first direction that is perpendicular to the back surface of the mobile device to a second direction that intersects with a region of space where the barcode is located. The one or more reflective surfaces may also be configured to redirect the targeting pattern from the first direction to the second direction.

The illumination optic system may include at least one illumination optic system lens that is at least partially aligned with the first illumination source of the mobile device when the mobile device is held in the cradle portion of the presentation stand. The at least one illumination optic system lens may be configured to modify a first illumination field emitted by the first illumination source to provide a system illumination field with a system angular size that is different from an angular size of the first illumination field.

The mobile device may further include a second illumination source. The illumination optic system may further include a target generating structure that is configured to shape a second illumination field emitted by the second illumination source into a targeting pattern when the mobile device is held in the cradle portion of the presentation stand. The shield portion may further include one or more reflective surfaces. The one or more reflective surfaces may be configured to redirect an optical pathway of the system field of view from a first direction that is perpendicular to the back surface of the mobile device to a second direction that intersects with a region of space where the barcode is located, redirect the system illumination field from the first direction to the second direction, and redirect the targeting pattern from the first direction to the second direction.

The shield portion may include a first chamber and a second chamber. The camera optic system may be housed in the first chamber. The illumination optic system may be housed in the second chamber. The shield portion may further include a barrier between the first chamber and the second chamber. The barrier may be configured to optically isolate the first chamber from the second chamber such that illumination from the first illumination source does not enter the camera without first reflecting from an object within the system field of view.

An arm may extend substantially upward from the base portion. A first connector may be positioned within the cradle portion and may be configured to be connected to the mobile device. A second connector may be configured to be connected to a power source. A cable may connect the first connector to the second connector and extend through at least a portion of the arm.

In accordance with another aspect of the present disclosure, a system for reading barcodes is disclosed. The system may include a mobile device that includes a camera, a first illumination source, a processor, memory in electronic communication with the processor, and a barcode reading application stored in the memory. The system may also include a presentation stand that includes a base portion configured for placement on a surface, a cradle portion connected to the base portion, and a shield portion attached to the cradle portion. The system may also include a camera optic system within the shield portion. The camera optic system may be at least partially aligned with the camera of the mobile device when the mobile device is held in the cradle portion. The camera optic system and the camera may define a barcode reading lens system. The barcode reading lens system may have a system field of view that is different from a field of view of the camera. The system may also include an illumination optic system within the shield portion. The illumination optic system may be at least partially aligned with the first illumination source when the mobile device is held in the cradle portion. The barcode reading application may be executable by the processor to activate the first illumination source in response to detecting a barcode within the system field of view.

The illumination optic system may include at least one illumination optic system lens that is at least partially aligned with the first illumination source of the mobile device when the mobile device is held in the cradle portion of the presentation stand. The at least one illumination optic system lens may be configured to modify a first illumination field emitted by the first illumination source to provide a system illumination field with a system angular size that is different from an angular size of the first illumination field. The shield portion may further include one or more reflective surfaces. The one or more reflective surfaces may be configured to redirect an optical pathway of the system field of view from a first direction that is perpendicular to a back surface of the mobile device to a second direction that intersects with a region of space in which the barcode is located. The one or more reflective surfaces may also be configured to redirect the system illumination field from the first direction to the second direction.

The illumination optic system may include a target generating structure that is at least partially aligned with the first illumination source when the mobile device is held in the cradle portion of the presentation stand. The target generating structure may be configured to shape a first illumination field emitted by the first illumination source into a targeting pattern. The shield portion may further include one or more reflective surfaces. The one or more reflective surfaces may be configured to redirect an optical pathway of the system field of view from a first direction that is perpendicular to a back surface of the mobile device to a second direction that intersects with a region of space in which the barcode is located. The one or more reflective surfaces may also be configured to redirect the targeting pattern from the first direction to the second direction.

The illumination optic system may include at least one illumination optic system lens that is at least partially aligned with the first illumination source of the mobile device when the mobile device is held in the cradle portion of the presentation stand. The at least one illumination optic system lens may be configured to modify a first illumination field emitted by the first illumination source to provide a system illumination field with a system angular size that is different from an angular size of the first illumination field. The mobile device may further include a second illumination source. The illumination optic system may further include a target generating structure that is at least partially aligned with the second illumination source when the mobile device is held in the cradle portion of the presentation stand. The target generating structure may be configured to shape a second illumination field emitted by the second illumination source into a targeting pattern. The shield portion may further include one or more reflective surfaces. The one or more reflective surfaces may be configured to redirect an optical pathway of the system field of view from a first direction that is perpendicular to a back surface of the mobile device to a second direction that intersects with a region of space in which the barcode is located, redirect the system illumination field from the first direction to the second direction, and redirect the targeting pattern from the first direction to the second direction.

The presentation stand may further include an arm extending substantially upward from the base portion, a first connector that is positioned within the cradle portion and that is configured to be connected to the mobile device, a second connector that is configured to be connected to a power source, and a cable that connects the first connector to the second connector and that extends through at least a portion of the arm.

BRIEF DESCRIPTION OF THE DRAWINGS

FIG. 2A is a side view of a presentation stand holding a mobile device.

DETAILED DESCRIPTION

The present disclosure is generally related to a presentation stand for a mobile device. As used herein, the term "presentation stand" refers to a stand that enables a mobile device to read barcodes in presentation mode. The term "mobile device" refers to a portable, hand-held computing device that includes a camera. A mobile device may also include at least one illumination source. Some examples of mobile devices include a smartphone, a tablet computer, and a hybrid tablet/smartphone device (often nicknamed a "phablet"). A presentation stand in accordance with the present disclosure may be configured to enable a mobile device to read barcodes in presentation mode.

Figure 1:
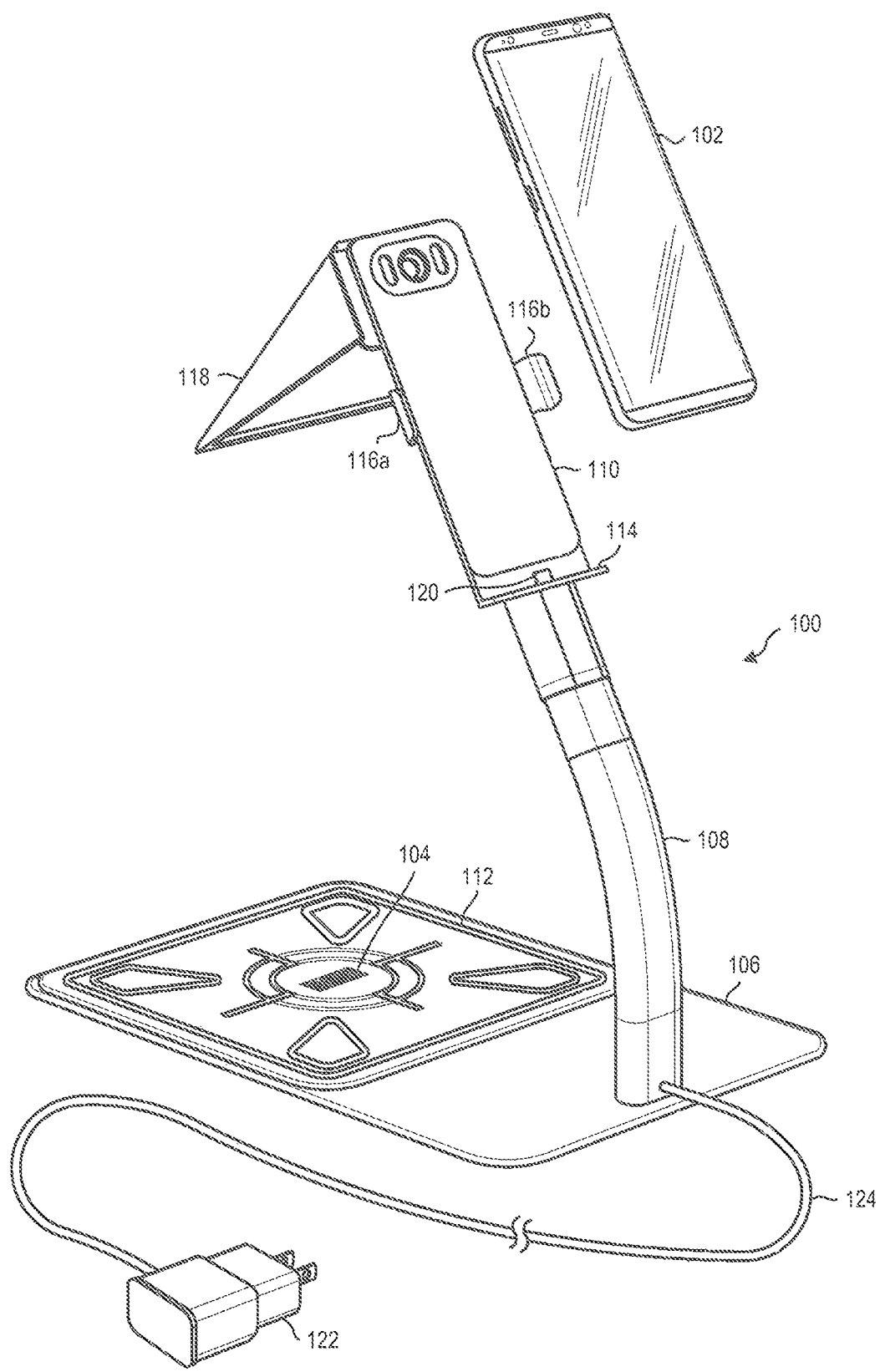
FIG. 1 illustrates a presentation stand in accordance with an embodiment of the present disclosure.

FIG. 1 illustrates a presentation stand 100 in accordance with an embodiment of the present disclosure. The presentation stand 100 enables a mobile device 102 to read barcodes (such as the barcode 104 shown in FIG. 1) in presentation mode. In the depicted embodiment, the mobile device 102 is a smartphone. However, a presentation stand in accordance with the present disclosure may be utilized in connection with other types of mobile devices.

The presentation stand 100 includes a base portion 106. The base portion 106 is configured so that it can be placed or mounted on a substantially flat surface (e.g., a desk, a table). An arm 108 extends substantially upward from the base portion 106.

The presentation stand 100 also includes a cradle portion 110 connected to the base portion 106. More specifically, the cradle portion 110 is connected to the arm 108, which is connected to the base portion 106. The cradle portion 110 is configured to hold the mobile device 102 in a position for reading a barcode 104. In the depicted embodiment, the barcode 104 is located on a surface 112 that has been placed on top of the base portion 106 of the presentation stand 100.

The cradle portion 110 includes several retaining members that hold the mobile device 102 in place. These retaining members include a ledge 114 at the bottom of the cradle portion 110 and two gripping members 116a-b on the sides of the cradle portion 110. The gripping members 116a-b are configured to fit securely around the sides of the mobile device 102.

The mobile device 102 includes a camera (which is not shown in FIG. 1). The camera of the mobile device 102 has a field of view. The field of view of a camera is the part of the world that is visible to the camera at a particular position and orientation in space. The field of view of the camera may be expressed in terms of an angular size.

The mobile device 102 also includes one or more illumination sources (which are also not shown in FIG. 1). Each illumination source emits a field of illumination. The field of illumination emitted by an illumination source refers to the part of the world that is illuminated by (or, in other words, receives light from) the illumination source. The field of illumination of the illumination source may also be expressed in terms of an angular size.

The presentation stand 100 includes a shield portion 118 attached to the cradle portion 110. The shield portion 118 may include one or more optic systems (not shown in FIG. 1) that are configured to enhance the barcode-reading capabilities of the mobile device 102. More specifically, the optic system(s) within the shield portion 118 may be configured to modify the field of view of the camera of the mobile device 102 and the field of illumination of the illumination source(s) of the mobile device 102, thereby altering the characteristics of images that are captured by the mobile device 102. The optic system(s) within the shield portion 118 may alter the characteristics of the captured images in such a way that the captured images are more suitable for reading barcodes than they otherwise would be.

The shield portion 118 also includes one or more reflective surfaces (not shown in FIG. 1) that are configured to redirect the field of view of the camera of the mobile device 102 and the field of illumination of the illumination source(s) of the mobile device 102. This makes it possible for the mobile device 102 to read a barcode 104 even when the mobile device 102 is being held in a position where the camera and the illumination source(s) are not directly facing the region of space where the barcode 104 is located. As mentioned above, in the depicted embodiment, the barcode 104 is located on a surface 112 that has been placed on top of the base portion 106 of the presentation stand 100. However, when the mobile device 102 is placed within the cradle portion 110 of the presentation stand 100, the mobile device 102 is not directly facing that surface 112. Therefore, without the reflective surface(s) within the shield portion 118, the barcode 104 would not appear within the field of view of the camera of the mobile device 102, nor would the barcode 104 be illuminated by the illumination source(s) of the mobile device 102. The reflective surface(s) within the shield portion 118 redirect the field of view of the camera of the mobile device 102 so that the barcode 104 appears within the camera's field of view. The reflective surface(s) within the shield portion 118 also redirect the field of illumination of the illumination source(s) of the mobile device 102 so that illumination from the illumination source(s) is directed onto the barcode 104.

The presentation stand 100 also includes a mechanism for supplying electricity to the mobile device 102. In particular, the presentation stand 100 includes a first connector, a mobile device connector 120, that is positioned within the cradle portion 110 of the presentation stand 100 and that is configured to be connected to the mobile device 102. The presentation stand 100 also includes a second connector, an electrical plug 122, that is configured to be connected to a power source. A cable 124 connects the mobile device connector 120 to the electrical plug 122. The cable 124 extends through at least a portion of the arm 108 of the presentation stand 100. Supplying electricity to the mobile device 102 in this manner enables the battery of the mobile device 102 to be charging while the mobile device 102 is being used to read barcodes 104.

Some examples of mobile device connectors 120 include a Lightning® connector, a Universal Serial Bus Type-C (or USB-C) connector, a micro-USB connector, and a mini-USB connector. The type of mobile device connector 120 that should be used depends on the particular type of mobile device 102 that is being used.

In the depicted embodiment, the electrical plug 122 is configured to be plugged into a standard electrical outlet that is connected to an alternating current (AC) power supply. In alternative embodiments, a different type of second connector may be used that is capable of supplying both power and data to the mobile device 102. For example, the second connector may be a USB connector that is configured to be connected to another computing device. In such an embodiment it would be possible to both supply electricity to the mobile device 102 (to charge the battery) and also to transfer data between the mobile device 102 and another computing device.

In an alternative embodiment, a presentation stand in accordance with the present disclosure may include a wireless power supply that is configured to transfer wireless power via induction to the mobile device 102 when the mobile device 102 is engaged with the presentation stand. The presentation stand may also be equipped with a wireless transceiver that facilitates wireless communication of data between the mobile device 102 and another computing device. The wireless transceiver may operate in accordance with any suitable wireless communication protocol, such as Bluetooth® and/or an Institute of Electrical and Electronics Engineers (IEEE) 802.11 standard (which are commonly referred to as Wi-Fi®). A presentation stand in accordance with the present disclosure may include a wireless power supply and a wireless transceiver instead of, or in addition to, the connector 120 and the electrical plug 124 that are included in the presentation stand 100 shown in FIG. 1.

Figure 1A:
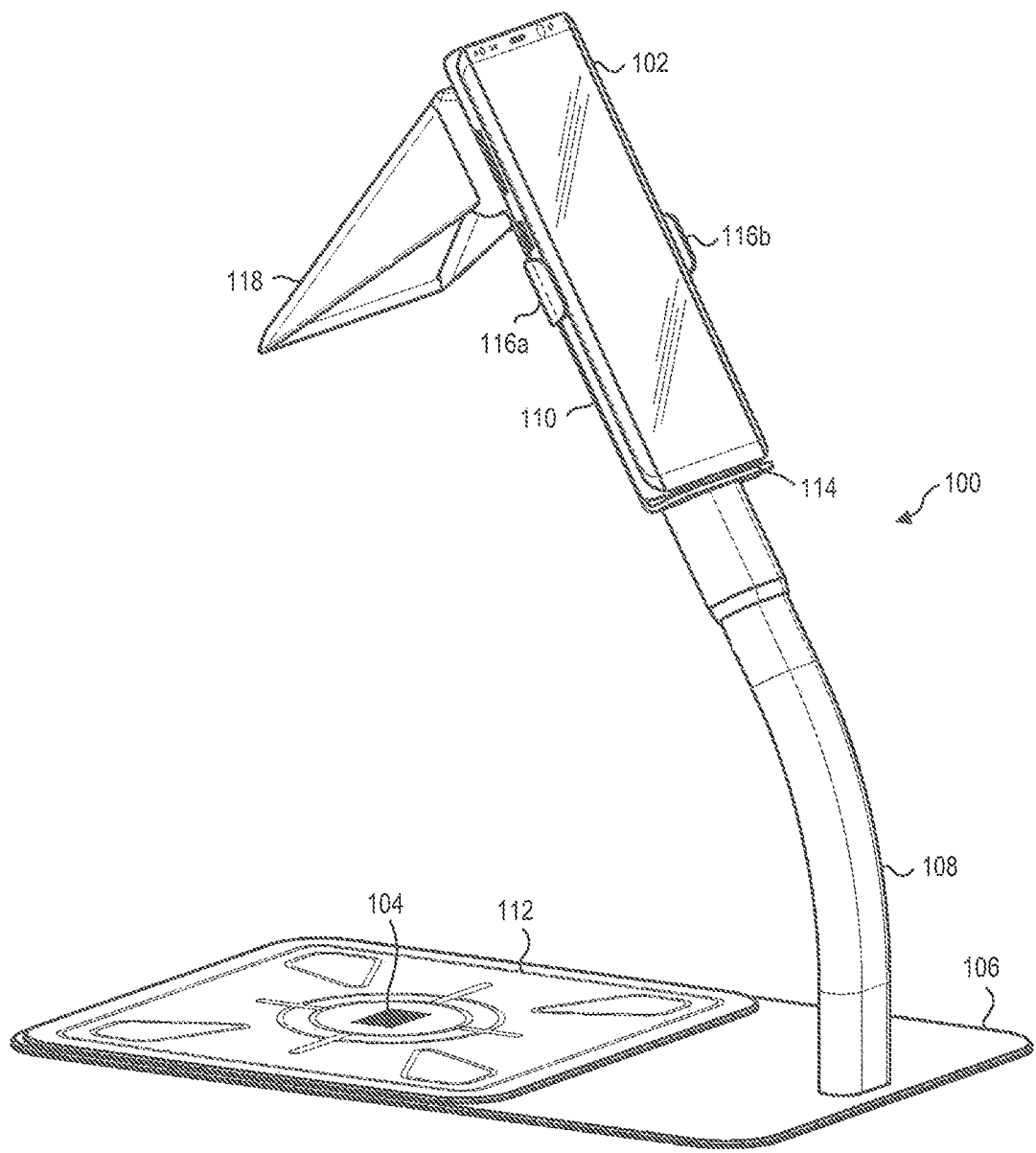
FIG. 1A shows the presentation stand of FIG. 1 holding a mobile device in a position where the mobile device is able to read barcodes in presentation mode.

FIG. 1A shows the presentation stand 100 holding the mobile device 102 in a position where the mobile device 102 is able to read barcodes 104 in presentation mode. In particular, the mobile device 102 has been placed within the cradle portion 110 of the presentation stand 100. The gripping members 116a-b on the sides of the cradle portion 110 and the ledge 114 at the bottom of the cradle portion 110 hold the mobile device 102 in place.

While FIGS. 1 and 1A illustrate an example in which the mobile device 102 is placed on the presentation stand 100, the presentation stand 100 may alternatively include components configured to receive different sizes and configurations of the mobile device 100 shown in FIG. 1A. For example, the cradle portion 110 may include adjustable components (e.g., adjustable gripping members 116a-b) that enable mobile devices or barcode assemblies of different sizes and dimensions to securely fit within the cradle portion 110. In this way, the cradle portion 110 can receive a mobile device 102 with or without a case, including a larger battery assist case that provides extended battery power or a basic case for protecting the mobile device 102. Indeed, the cradle portion 110 may be sized or include components that enable a device assembly to be placed securely within the cradle portion 110 of the presentation stand 100. The device assembly may include a mobile device in addition to a battery assist case including modified optics (e.g., a barcode reading enhancement accessory).

Figure 2:
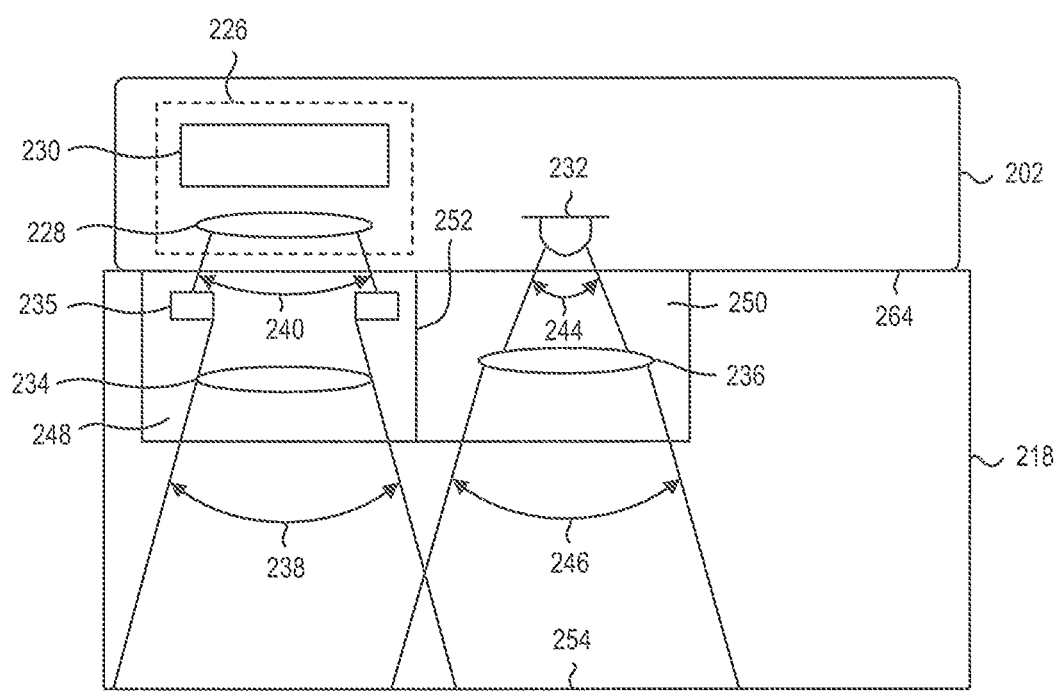
FIG. 2 is a top-down, cross-sectional view illustrating some components of a mobile device and some components of a shield portion of a presentation stand in accordance with an embodiment of the present disclosure.

FIG. 2 is a top-down, cross-sectional view illustrating some components of a mobile device 202 and some components of a shield portion 218 of a presentation stand 100 in accordance with an embodiment of the present disclosure. The mobile device 202 includes a camera 226, which includes a camera lens 228 and an image sensor 230. The mobile device 202 also includes an illumination source 232, which may be a white light source (and which alternatively may be referred to as a flash or an illumination torch). The shield portion 218 includes a camera optic system and an illumination optic system. The camera optic system includes a lens 234, which may be referred to herein as a camera optic system lens 234. The camera optic system also includes a barrier that defines an aperture 235. The illumination optic system also includes a lens 236, which may be referred to herein as an illumination optic system lens 236.

FIG. 2 shows the mobile device 202 when it is being held in the cradle portion 110 of the presentation stand 100 (as shown in FIG. 1A, for example). In this position, the camera optic system is at least partially aligned with the camera 226 and the illumination optic system is at least partially aligned with the illumination source 232. More specifically, the camera optic system lens 234 and the aperture 235 are at least partially aligned with the camera lens 228, and the illumination optic system lens 236 is at least partially aligned with the illumination source 232.

When the camera optic system of the shield portion 218 is at least partially aligned with the camera 226 of the mobile device 202, as shown in FIG. 2, the combined lens system that is formed by the camera lens 228, the aperture 235, and the camera optic system lens 234 may be referred to herein as a barcode reading lens system. Similarly, when the illumination optic system of the shield portion 218 is at least partially aligned with the illumination source 232 of the mobile device 102, as shown in FIG. 2, the combined illumination system that is formed by the illumination source 232 and the illumination optic system lens 236 may be referred to herein as an exposure illumination system.

The camera optic system may be configured to modify the field of view 240 of the camera 226 of the mobile device 202 such that the field of view 238 of the barcode reading lens system is different from the field of view 240 of the camera 226 by itself. More specifically, the camera optic system lens 234 and the aperture 235 may be configured to modify the field of view of the camera lens 228 of the mobile device 202 such that the angular size of the field of view 238 of the barcode reading lens system is different from the angular size of the field of view 240 of the camera 226 by itself. For example, the angular size of the field of view 238 of the barcode reading lens system may be significantly smaller than the angular size of the field of view 240 of the camera 226 by itself. This is because the camera 226 may be designed for general purpose photography, which often uses a wider lens angle than is needed for capturing barcode images.

The illumination optic system may be configured to modify the field of illumination 244 emitted by the illumination source 232 such that the field of illumination 246 emitted by the exposure illumination system is different from the field of illumination 244 emitted by the illumination source 232 by itself. More specifically, the illumination optic system lens 236 may be configured to modify the field of illumination 244 emitted by the illumination source 232 such that the angular size of the field of illumination 246 emitted by the exposure illumination system is different from the angular size of the field of illumination 244 emitted by the illumination source 232 by itself. For example, in one or more implementations, the optic system lens 236 is configured to narrow an angle of illumination of received light, thereby decreasing an angle of the field of illumination 246 relative to the field of illumination emitted by the illumination source 232. Alternatively, the optic system lens 236 may broaden an angle of illumination of received light, thereby increasing an angle of the field of illumination 246 relative to the field of illumination emitted by the illumination source 232. Indeed, the optic illumination system may include a series of multiple lenses (not shown) having different characteristics configured to focus the light emitted by the illumination source 232 in a variety of ways. As will be discussed further in reference to other figures below, the illumination optic system may include additional components to further modify one or multiple fields of illumination emitted by illumination source(s).

The shield portion 218 includes a first chamber 248 and a second chamber 250. The camera optic system (including the camera optic system lens 234) is housed in the first chamber 248, and the illumination optic system (including the illumination optic system lens 236) is housed in the second chamber 250. The shield portion 218 additionally includes a barrier 252 between the first chamber 248 and the second chamber 250. The barrier 252 is configured to optically isolate the first chamber 248 from the second chamber 250 such that illumination from the illumination source 232 does not enter the camera 226 without first reflecting from an object (such as a barcode 104) within the field of view 238 of the barcode reading lens system.

The shield portion 218 additionally includes a reflective surface 254. When the mobile device 202 is being held in the cradle portion 110 of the presentation stand 100 (as shown in FIG. 1A, for example), the reflective surface 254 redirects the optical pathway of the field of view 238 of the barcode reading lens system. The reflective surface 254 also redirects the field of illumination 246 emitted by the exposure illumination system. Referring to FIG. 2 and FIG. 2A simultaneously, the optical pathway of the field of view 238 of the barcode reading lens system and the field of illumination 246 emitted by the exposure illumination system may be redirected from a first direction 260 that is perpendicular to the back surface 264 of the mobile device 202 to a second direction 262 that intersects with a region of space where a barcode 104 is located (e.g., the surface 112 on the base portion 106 of the presentation stand 200).

The field of view of the barcode reading lens system and the field of illumination of the exposure illumination system may substantially overlap, both before and after being redirected by the reflective surface 254. Thus, the field of illumination emitted by the exposure illumination system may illuminate the field of view of the barcode reading lens system.

In the embodiment shown in FIG. 2, the camera optic system includes a camera optic system lens 234 and a barrier that defines an aperture 235. The illumination optic system includes an illumination optic system lens 236. In alternative embodiments, however, a camera optic system and/or an illumination optic system may include other types of components either in place of or in addition to the components in the optic systems shown in FIG. 2. In general, a camera optic system may be any set of one or more components positioned in the field of view of a camera to modify one or more parameters regarding light received by the camera, such as the quantity of light received, the optical pathway along which light is received, the angular size of the field of view, the depth of field, the focus distance, and/or the wavelength(s) of light received. An illumination optic system may be any set of one or more components at least partially aligned with an illumination source to modify one or more parameters regarding light emitted by the illumination source. An optic system (either a camera optic system or an illumination optic system) may include any of various components such as lenses, filters, mirrors, apertures, etc.

Figure 3:
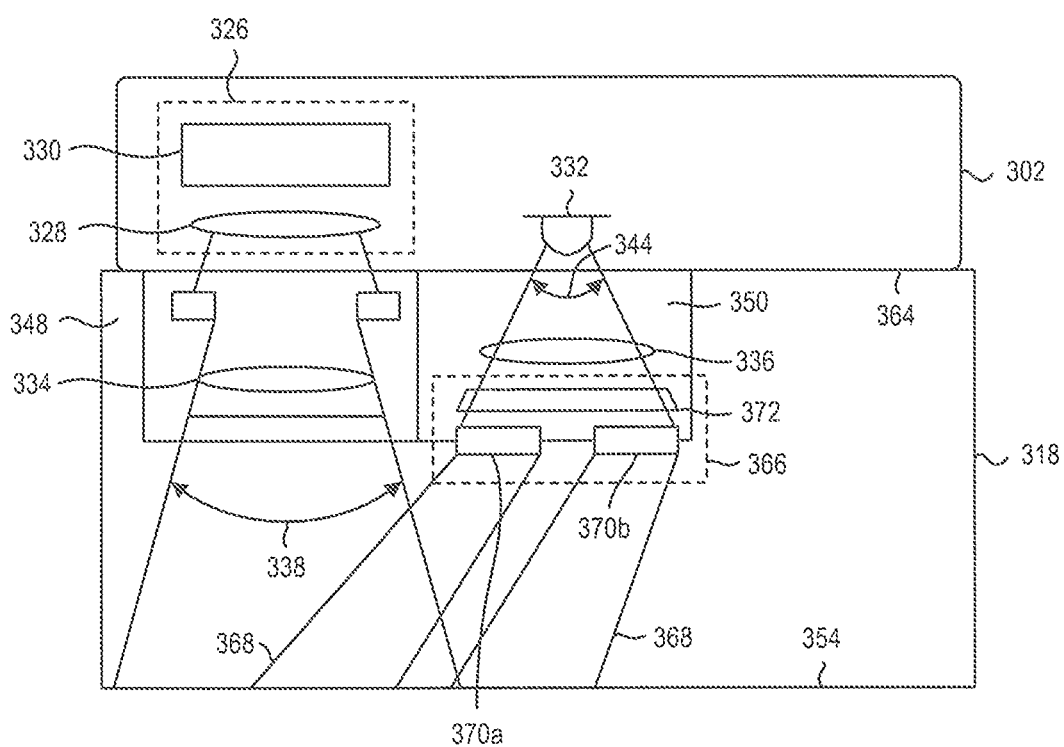
FIG. 3 is a top-down, cross-sectional view illustrating some components of a mobile device and some components of a shield portion of a presentation stand in accordance with another embodiment of the present disclosure.

FIG. 3 is a top-down, cross-sectional view illustrating some components of a mobile device 302 and some components of a shield portion 318 of a presentation stand 100 in accordance with another embodiment of the present disclosure. The embodiment shown in FIG. 3 is similar to the embodiment shown in FIGS. 2 and 2A, except as discussed below.

In the embodiment shown in FIG. 3, the illumination optic system of the shield portion 318 includes a target generating structure 366. When the mobile device 302 is being held in the cradle portion 110 of the presentation stand 100, the target generating structure 366 is at least partially aligned with the illumination source 332. The target generating structure 366 is configured to modify the illumination field 344 that is emitted by the illumination source 332 to generate a targeting pattern 368. More specifically, the target generating structure 366 includes a pair of apertures 370a-b. These apertures 370a-b are configured to shape the illumination field 344 that is emitted by the illumination source 332 to generate the targeting pattern 368.

The target generating structure 366 may also include a filter 372 that is configured to pass illumination corresponding to a particular range of wavelengths and filter out any illumination having a wavelength that falls outside that range. The range of wavelengths that is passed by the filter 372 may correspond to a particular color, thereby causing the targeting pattern 368 to have that same color. For example, the filter 372 may be configured to pass illumination having a wavelength within a range that corresponds to the color red (e.g., 620-750 nm) and block illumination having a wavelength outside of that range. This would cause the targeting pattern 368 to appear as a red pattern on the surface 112.

The illumination optic system may also include a lens 336 that is configured similarly to the illumination optic system lens 236 discussed previously. For example, the lens 336 may be configured to modify the field of illumination 344 emitted by the illumination source 332.

The reflective surface 354 is configured to redirect both the optical pathway of the field of view 338 of the barcode reading lens system and the targeting pattern 368. The manner in which redirection occurs may be similar to the reflective surface 254 discussed previously. More specifically, referring to FIG. 2A in connection with FIG. 3, the optical pathway of the field of view 338 of the barcode reading lens system and the targeting pattern 368 may be redirected from a first direction 260 that is perpendicular to the back surface 364 of the mobile device 302 to a second direction 262 that intersects with a region of space where a barcode is located.

Figure 4:
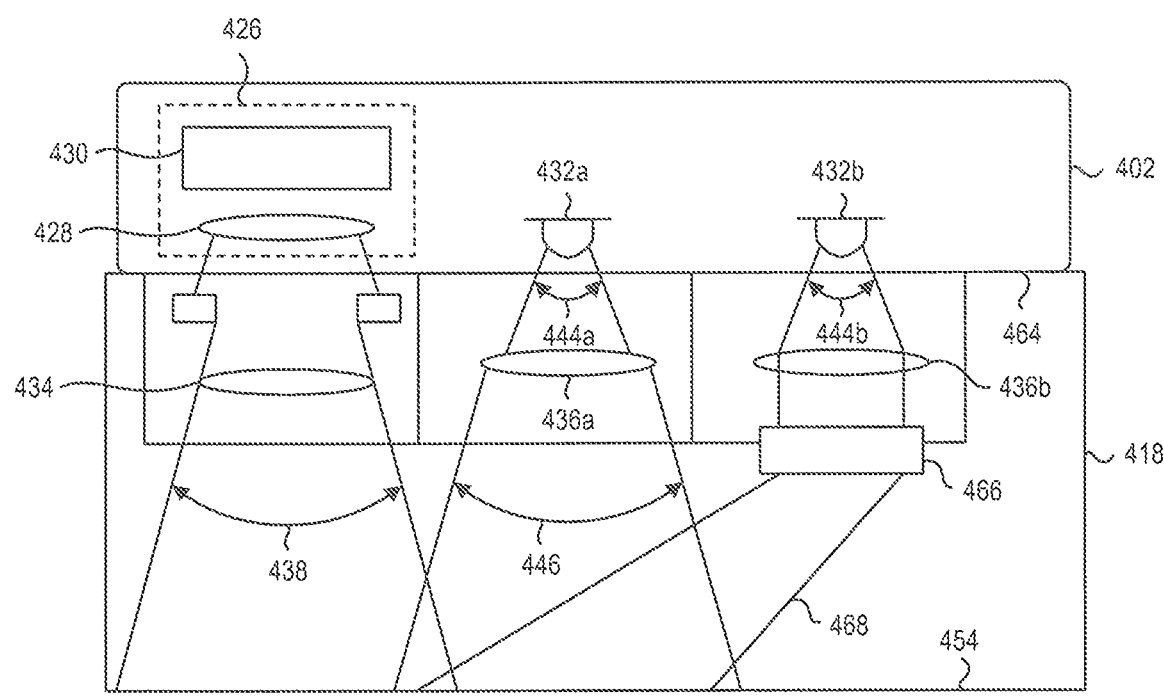
FIG. 4 is a top-down, cross-sectional view illustrating some components of a mobile device and some components of a shield portion of a presentation stand in accordance with another embodiment of the present disclosure.

FIG. 4 is a top-down, cross-sectional view illustrating some components of a mobile device 402 and some components of a shield portion 418 of a presentation stand 100 in accordance with another embodiment of the present disclosure. The embodiment shown in FIG. 4 is similar to the embodiment shown in FIGS. 2 and 2A, except as indicated below.

In the embodiment shown in FIG. 4, the mobile device 402 includes a first illumination source 432a and a second illumination source 432b. The first illumination source 432a may be a white light source as previously described. The second illumination source 432b may be, for example, a red or blue LED.

The illumination optic system includes an illumination optic system lens 436a. The illumination optic system also includes a target generating structure 466. When the mobile device 402 is being held in the cradle portion 110 of the presentation stand 100, the illumination optic system lens 436a is at least partially aligned with the first illumination source 432a of the mobile device 402, and the target generating structure 466 is at least partially aligned with the second illumination source 432b of the mobile device 402.

As noted above, the combined illumination system that is formed by the illumination optic system lens 436a and the first illumination source 432a may be referred to herein as an exposure illumination system. The illumination optic system lens 436a may be configured to modify the field of illumination 444a emitted by the first illumination source 432a such that the angular size of the field of illumination 446 emitted by the exposure illumination system is different from the angular size of the field of illumination 444a emitted by the first illumination source 432a.

The target generating structure 466 may be configured to modify the field of illumination 444b that is emitted by the second illumination source 432b to generate a targeting pattern 468. In other words, the target generating structure 466 may be configured so that the field of illumination 444b that is emitted by the illumination source 432b is shaped by the target generating structure 466 into a targeting pattern 468. The target generating structure 466 may be configured similarly to the target generating structure 366 discussed previously, and may include a filter (such as the filter 372) and one or more apertures (such as the apertures 370a-b). In addition to the target generating structure 466, another lens 436b within the illumination optic system may also modify the field of illumination 444b emitted by the second illumination source 432b.

The reflective surface 454 is configured to redirect the optical pathway of the field of view 438 of the barcode reading lens system, the field of illumination 446 emitted by the exposure illumination system, and the targeting pattern 468. The manner in which redirection occurs may be similar to the reflective surface 254 discussed previously. More specifically, referring to FIG. 2A in connection with FIG. 4, the optical pathway of the field of view 438 of the barcode reading lens system, the field of illumination 446 emitted by the exposure illumination system, and the targeting pattern 468 may be redirected from a first direction 260 that is perpendicular to the back surface 464 of the mobile device 402 to a second direction 262 that intersects with a region of space where a barcode is located.

Figure 5:
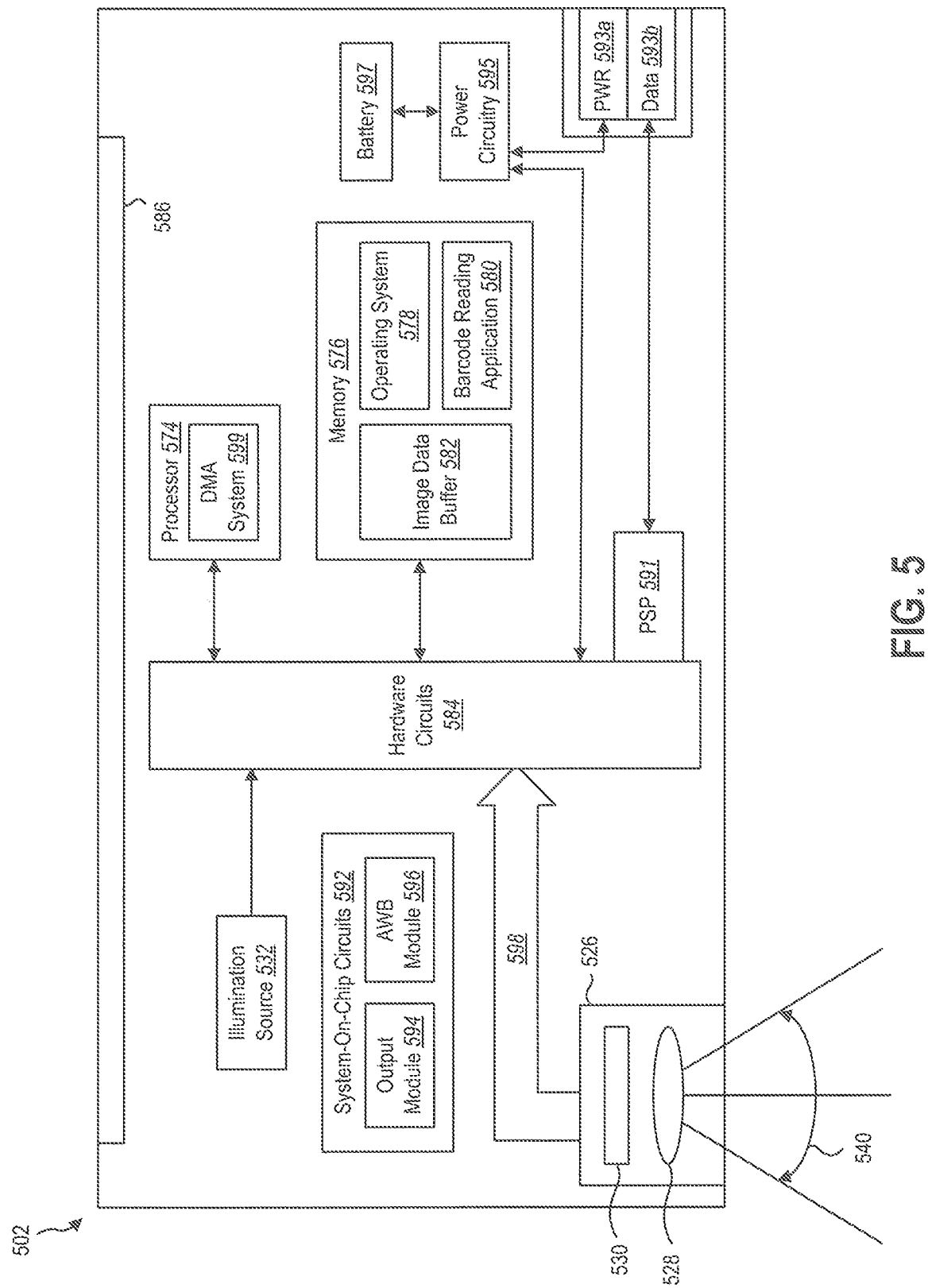
FIG. 5 is a block diagram of some components within a mobile device that may be used with a presentation stand as disclosed herein.

FIG. 5 is a block diagram of some components within a mobile device 502 that may be used with a presentation stand as disclosed herein. Any of the mobile devices 102, 202, 302, 402 that were previously described may include some or all of the components in the mobile device 502 shown in FIG. 5.

The mobile device 502 includes a processor 574. The processor 574 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 574 may be referred to as a central processing unit (CPU). Although just a single processor 574 is shown in the mobile device 502 of FIG. 5, in an alternative configuration, a combination of processors (e.g., an ARM and DSP) could be used.

The mobile device 502 also includes memory 576 in electronic communication with the processor 601. The memory 576 may be any electronic component capable of storing electronic information. For example, the memory 576 may be embodied as random access memory (RAM), read-only memory (ROM), flash memory devices in RAM, on-board memory included with the processor 574, erasable programmable read-only memory (EPROM), electrically erasable programmable read-only memory (EEPROM) memory, registers, and so forth, including combinations thereof.

The memory 576 includes an operating system 578, one or more applications including a barcode reading application 580, and an image data buffer 582. In operation, the processor 574 may execute instructions embodied in the operating system 578 and each of the applications, including the barcode reading application 580. One or more hardware circuits 584 interface the processor 574 with peripheral systems including, but not limited to, a display screen 586 (which may be a touchscreen), a camera assembly 526, an illumination source 532, and a hardwired peer-to-peer (P2P) communication interface 591.

The camera assembly 526 may include an image sensor 530, which is a two-dimensional array of pixels with each pixel comprising an active photosensitive region capable of measuring or quantifying the intensity of illumination incident on the pixel. The pixels of the image sensor 530 may be fabricated using charge-coupled display (CCD) technology, complementary metal-oxide-semiconductor (CMOS) technology, or the like. The image sensor 530 may be capable of capturing color images. The image sensor 530 may be positioned parallel to the face surface and the back surface of the mobile device 502. The camera assembly 526 may also include a lens assembly 528 with an optical axis 588 orthogonal to the image sensor 530 and defining a center line of a camera field of view 540 extending outward from the back surface of the mobile device 502.

The lens assembly 528 may receive light reflected from objects within the camera field of view 540. The camera field of view 540 may have an angular size, which may be defined as the angle at which the camera field of view 540 spreads with respect to distance from the lens assembly 528. The lens assembly 528 may have a camera aperture size measured as an f-number. This is the ratio of the focal length of the lens assembly 528 to the diameter of the entrance pupil, which in this context refers to the lens aperture (an aperture stop or an inherent aperture of the lens component defining the aperture) as viewed through the front of the lens assembly 528.

The image sensor 530 may be coupled to system-on-chip circuits 592 which include an output module 594 and an auto-white balance module 596. In one embodiment, the output module 594 controls the operation of the image sensor 530 (e.g., exposure, gain, and coupling of pixels to analog-to-digital (A/D) converters for image read out), formats the digital intensity values of each pixel of the image sensor 530 for color image output, and makes the color image output available for writing to the image data buffer 582.

In another embodiment, the output module 594 may perform image processing on images captured by the image sensor 530. Control of the image sensor 530 and image pre-processing are described in more detail in U.S. patent application Ser. No. 14/717,112. The auto-white balance module 596 may perform auto-white balance algorithms on captured images to enhance the quality of color images captured by the image sensor 530 under different illumination conditions. The digital image output 598 (which may be an image, such as a color image, or a result of processing an image one or more times in accordance with the teachings of the Ser. No. 14/717,112 application) may be written to the image data buffer 582. The mobile device 502 may include a direct memory access (DMA) system 599 which may be a part of the processor 574. The DMA system 599 provides for direct writing of the digital image output 598 from the camera assembly 526 to the image data buffer 582.

The mobile device 502 may further include a connector 593, which may include a power connector 593a and a data connector 593b. When the mobile device 502 is inserted into the cradle portion 110 of the presentation stand 100, the connector 120 on the presentation stand 100 may be connected to (e.g., inserted into) the connector 593 within the mobile device 502. This enables electricity to be supplied to the mobile device 502 via the power connector 593a. This may also facilitate data transfer between the mobile device 502 and another computing device via the data connector 593b and, for example, the P2P communication interface 591. The P2P communication interface 591 may utilize Universal Asynchronous Receiver/Transmitter (UART), USB, or similar communication protocols for communicating with a compatible system connected to the data connector 593b.

The mobile device 502 may further include a battery 597 and power circuitry 595. In general the power circuitry 595 controls the charging of the battery 597 from power received from an external power source via the power connector 593a. The power circuitry 595 provides operating power at the voltage and current drawing requirements of the various components of the mobile device 502 from the power received from the battery 597 or the external power source (when connected to the external power source).

Figure 6:
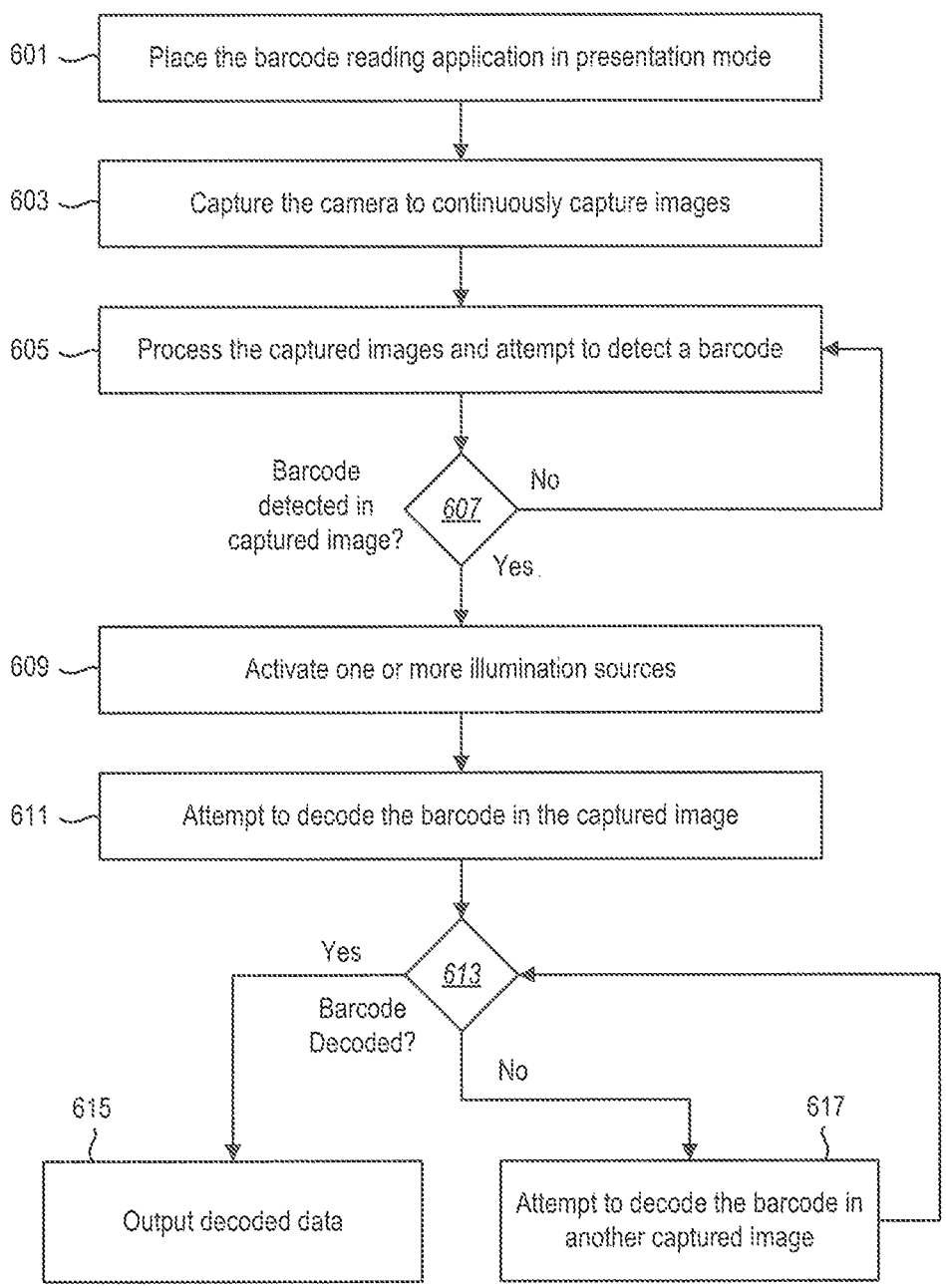
FIG. 6 is a flow diagram that illustrates a method that may be performed by a barcode reading application in a mobile device when a presentation stand is being used to enable the mobile device to read barcodes in presentation mode.

FIG. 6 is a flow diagram that illustrates a method 600 that may be performed by a barcode reading application in a mobile device when a presentation stand is being used to enable the mobile device to read barcodes in presentation mode. For the sake of clarity, the method 600 will be described in relation to various components that have been described previously, such as the presentation stand 100 shown in FIG. 1, the shield portion 218 and the mobile device 202 shown in FIG. 2, and the barcode reading application 580 shown in FIG. 5.

At least some operations of the method 600 may be performed after a mobile device 202 has been secured to the presentation stand 100. Securing the mobile device 202 to the presentation stand 100 may involve placing the mobile device 202 within the cradle portion 110 of the presentation stand 100 such that the bottom portion of the mobile device 202 rests on the ledge 114 and the gripping members 116a-b fit securely around the sides of the mobile device 202. Prior to the depicted steps of the method 600, the mobile device 202 may be outside of the presentation stand 100.

At some point (either before or after the mobile device 202 is secured to the presentation stand 100), the barcode reading application 580 may be placed 601 in presentation mode. Prior to being placed in the presentation mode, the barcode reading application 580 may be in a trigger mode. In trigger mode, barcodes are read in response to user input. In presentation mode, barcodes are read automatically when they are detected within the field of view 238 of the barcode reading lens system (e.g., the combination of the camera lens 228 and the camera optic system lens 234 in the shield portion 218 of the presentation stand 100). Thus, when the barcode reading application 580 is in presentation mode, the barcode reading application 580 may continuously attempt to detect a barcode within the field of view 238 of the barcode reading lens system. More specifically, the barcode reading application 580 may cause 603 the camera 226 to continuously capture images. The barcode reading application 580 may process 605 the captured images and attempt to detect a barcode therein.

The barcode reading application 580 may be placed in presentation mode in a number of ways. As an example, the barcode reading application 580 may receive an input (e.g., a user input) including an indication or instructions to engage presentation mode. For instance, prior to placing the mobile device 102 on the presentation stand 100, the barcode reading application 580 may detect a user input to engage a presentation mode after which the mobile device 102 may be placed on the cradle portion 110 of the stand 100.

Alternatively, in one or more implementations, the barcode reading application 580 may engage the presentation mode in response to detecting proximity of the stand 100 or otherwise determining that the mobile device 102 is in a position to commence reading barcodes 104 on the surface 112 of the base portion 106 of the stand 100. As an example, the base portion 106 may include a configuration pattern designed or otherwise displayed on the surface 112 of the base portion 106 that the barcode reading application 580 is configured to detect. In response to detecting the configuration pattern, the barcode reading application 580 may engage the presentation mode. The barcode reading application 580 may detect the configuration pattern before the mobile device 102 has been placed in the cradle portion 110 of the presentation stand 100. For example, a user may hold the mobile device 102 over the base portion 106 so that the configuration pattern appears in the field of view of the camera of the mobile device 102 and is detected by the barcode reading application 580. Alternatively, the barcode reading application 580 may detect the configuration pattern after the mobile device 102 has been placed in the cradle portion 110 of the presentation stand 100. In this case, the configuration pattern may be reflected off one or more reflective surfaces within the shield portion 118 so that the configuration pattern appears in the field of view of the camera of the mobile device 102 and is detected by the barcode reading application 580. Regardless of where the mobile device 102 is located when the configuration pattern is detected, the barcode reading application 580 may engage the presentation mode. The same configuration pattern may be detected repeatedly. If this occurs, the barcode reading application 580 may simply remain in presentation mode.

The barcode reading application 580 may additionally disengage from the presentation mode when the mobile device 100 is no longer in the cradle portion 110 of the stand 100. For example, where the barcode reading application 580 fails to detect a configuration pattern on the surface 112 of the base portion 106 of the stand or fails to detect a configuration pattern displayed on the mobile device 102 for a threshold period of time (e.g., a predetermined duration of time or a threshold number of sequentially captured images), the barcode reading application 580 may disengage from the presentation mode (e.g., engage a trigger mode) and cease causing the camera 226 to continuously capture images.

When a barcode is detected 607 within a captured image, the barcode reading application 580 may, in response, activate 609 one or more illumination sources 232. The additional illumination provided by the illumination source(s) 232 may serve as a signal to a user that a barcode has been detected. The additional illumination may also enhance the quality of subsequently captured images, thereby making it easier to decode the detected barcode.

In addition to activating 609 the illumination source(s) 232, the barcode reading application 580 may also attempt 611 to decode the barcode that has been detected in the captured image. If the barcode reading application 580 determines 613 that decoding is successful, then the barcode reading application 580 may output 615 decoded data. This may involve displaying the decoded data on a display screen of the mobile device 202 and/or sending the decoded data to another computing device (e.g., via the P2P communication interface 591 and the data connector 593b) to be displayed there.

If the barcode reading application 580 determines 613 that decoding is not successful, then the barcode reading application 580 may attempt 617 to decode the barcode in another captured image. These operations may be repeated until the barcode is successfully decoded or until some event occurs which indicates that additional decoding efforts should be discontinued (e.g., a barcode is no longer detected within the field of view 238 of the barcode reading lens system).

Figure 7:
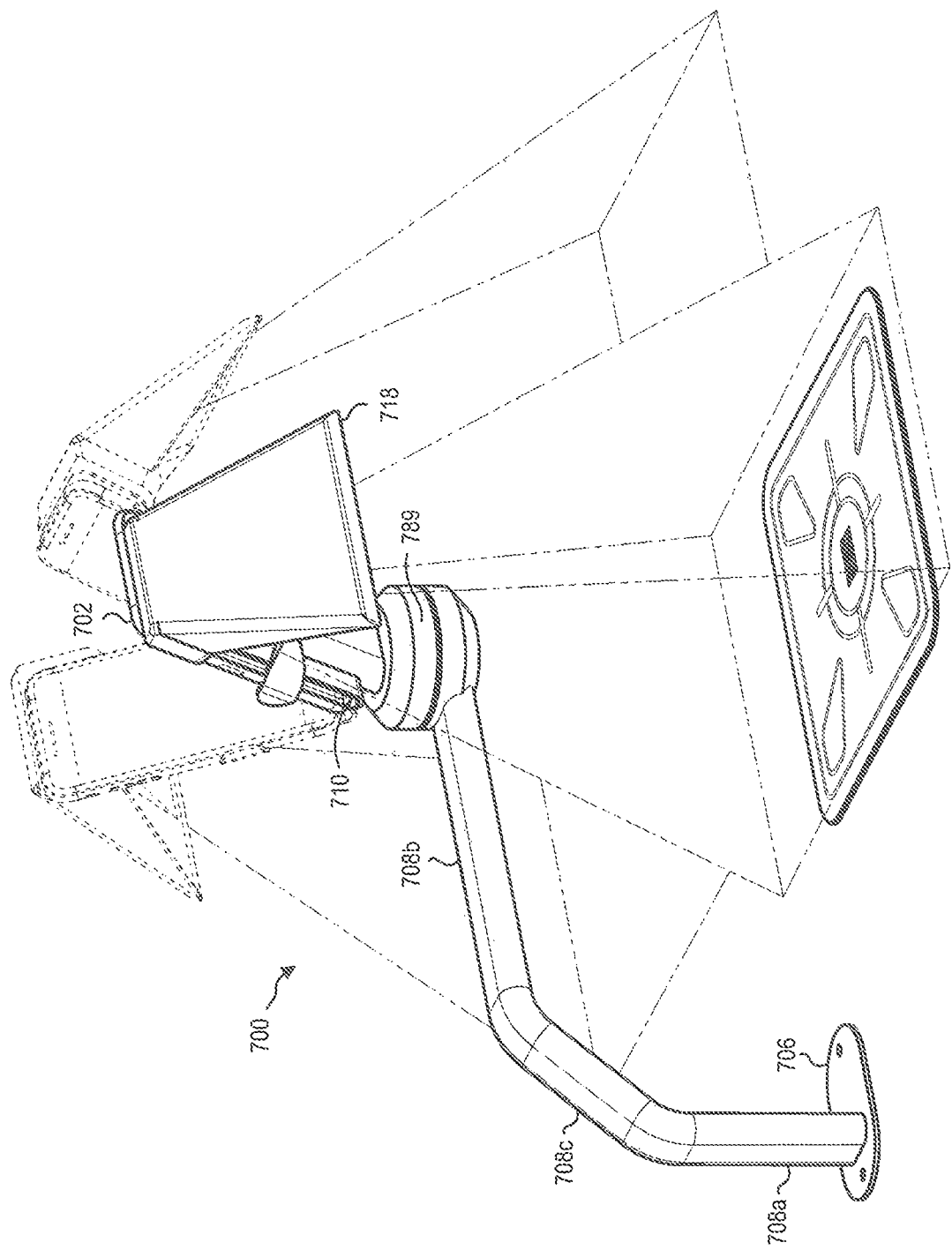
FIG. 7 illustrates a presentation stand in accordance with another embodiment of the present disclosure.

FIG. 7 illustrates a presentation stand 700 in accordance with another embodiment of the present disclosure. The embodiment shown in FIG. 7 is similar to the embodiment shown in FIG. 1, except as discussed below.

As in the presentation stand 100 shown in FIG. 1, the presentation stand 700 shown in FIG. 7 includes a base portion 706 and a cradle portion 710 connected to the base portion 706. In the embodiment shown in FIG. 7, however, there is a first arm portion 708a that extends upward in a substantially vertical direction from the base portion 706, a second arm portion 708b that extends outward in a substantially horizontal direction and connects to the cradle portion 710, and a third arm portion 708c that connects the first arm portion 708a and the second arm portion 708b.

The second arm portion 708b connects to the cradle portion 710 via a swivel joint 789. The swivel joint 789 is configured so that it can be rotated. This allows the mobile device 702 to be rotated into different positions. Several different positions are shown in FIG. 7.

In the foregoing discussion, the phrase "at least partially aligned" was sometimes used to describe an object in a mobile device (e.g., a camera lens 228) and an optical component in the shield portion of a presentation stand (e.g., a camera optic system lens 234). In this context, the phrase "at least partially aligned" refers to an arrangement of the object and the optical component in which it is possible to draw a straight line that (i) is perpendicular to the front and/or back surfaces of the mobile device, and (ii) passes through the object and the optical component. For example, referring to FIG. 2, the camera optic system lens 234 and the illumination optic system lens 236 are at least partially aligned with one another because it is possible to draw a straight line that is perpendicular to the back surface 264 of the mobile device 202 and still passes through both of these lenses 234, 236. In fact, the lenses 234, 236 in FIG. 2 are mostly if not completely aligned, and one or both the lenses 234, 236 could be moved somewhat and still be considered to be partially aligned as that phrase is used herein.

For purposes of the present disclosure, two objects may be considered to be "connected" or "attached" to one another even if they are not directly connected or attached. In other words, two objects may be considered to be connected or attached to one another even if they do not directly touch one another and there are one or more other items that join or link the objects together. For example, referring to the presentation stand 100 in FIG. 1, the cradle portion 110 is connected or attached to the base portion 106, even though the cradle portion 110 is not directly touching the base portion 106 and the arm 108 is located between the cradle portion 110 and the base portion 106.

The term "substantially" refers to an amount of something that is considerable or significant, even if it is not necessarily complete or absolute. For example, the arm 108 of the presentation stand 100 shown in FIG. 1 extends substantially upward from the base portion 106 of the presentation stand 100 because the arm 108 is mostly pointing upward, although the arm 108 is not fully oriented in a vertical direction. In some embodiments, a device member (e.g., the arm 108 of the presentation stand 100 shown in FIG. 1) may be said to be extending substantially upward (or extending upward in a substantially vertical direction) if at least some portion of the device member is oriented within 1° of a vertical direction. In other embodiments, a device member may be said to be extending substantially upward if at least some portion of the device member is oriented within 10° of a vertical direction. In still other embodiments, a device member may be said to be extending substantially upward if at least some portion of the device member is oriented within 30° of a vertical direction.

Similarly, a device member (e.g., the second arm portion 708b of the presentation stand 700 shown in FIG. 7) may be said to be extending outward in a substantially horizontal direction if at least some portion of the device member is oriented within 1° of a horizontal direction. In other embodiments, a device member may be said to be extending outward in a substantially horizontal direction if at least some portion of the device member is oriented within 10° of a horizontal direction. In still other embodiments, a device member may be said to be extending outward in a substantially horizontal direction if at least some portion of the device member is oriented within 30° of a horizontal direction.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A presentation stand for enabling a mobile device to read barcodes in presentation mode, the mobile device comprising a camera and a first illumination source, the presentation stand comprising:
    a base portion;
    a cradle portion connected to the base portion, the cradle portion being configured to hold the mobile device in a position for reading a barcode;
    a shield portion attached to the cradle portion, the shield portion being configured to modify a field of view of the camera and a field of illumination of the first illumination source, the shield portion comprising:
        a camera optic system that is at least partially aligned with the camera of the mobile device when the mobile device is held in the cradle portion, wherein the camera and the camera optic system define a barcode reading lens system, and wherein the barcode reading lens system has a system field of view that is different from the field of view of the camera; and
        an illumination optic system that is at least partially aligned with the first illumination source of the mobile device when the mobile device is held in the cradle portion; and
    one or more reflective surfaces that redirect an optical pathway of the system field of view from a first direction that does not intersect with a region of space where the barcode is located to a second direction that intersects with the region of space where the barcode is located.

2. The presentation stand of claim 1, wherein:
    the illumination optic system and the first illumination source of the mobile device define an exposure illumination system; and
    the exposure illumination system emits a system illumination field with a system angular size that is different from an angular size of a first illumination field emitted by the first illumination source.

3. The presentation stand of claim 2, wherein the one or more reflective surfaces are additionally configured to:
    redirect the system illumination field from the first direction to the second direction.

4. The presentation stand of claim 1, wherein:
    the illumination optic system comprises a target generating structure that is at least partially aligned with the first illumination source when the mobile device is held in the cradle portion of the presentation stand, the target generating structure being configured to modify a first illumination field emitted by the first illumination source to generate a targeting pattern.

5. The presentation stand of claim 4, wherein the one or more reflective surfaces are additionally configured to:
    redirect the targeting pattern from the first direction to the second direction.

6. The presentation stand of claim 1, wherein:
    the illumination optic system comprises at least one illumination optic system lens, the at least one illumination optic system lens and the first illumination source of the mobile device defining an exposure illumination system, the exposure illumination system emitting a system illumination field with a system angular size that is different from an angular size of a first illumination field emitted by the first illumination source;

the mobile device further comprises a second illumination source; and the illumination optic system further comprises a target generating structure that is at least partially aligned with the second illumination source when the mobile device is held in the cradle portion of the presentation stand, the target generating structure being configured to modify a second illumination field emitted by the second illumination source to generate a targeting pattern.

7. The presentation stand of claim 6, wherein the one or more reflective surfaces are additionally configured to:

redirect the system illumination field from the first direction to the second direction; and redirect the targeting pattern from the first direction to the second direction.

8. The presentation stand of claim 1, wherein:

the shield portion comprises a first chamber and a second chamber;

the camera optic system is housed in the first chamber;

the illumination optic system is housed in the second chamber; and the first chamber is optically isolated from the second chamber.

9. The presentation stand of claim 1, further comprising:

a first connector that is configured to be connected to the mobile device;

a second connector that is configured to be connected to a power source; and a cable connecting the first connector to the second connector.

10. A presentation stand for enabling a mobile device to read barcodes in presentation mode, the mobile device comprising a camera and a first illumination source, the camera comprising a camera lens, the presentation stand comprising:

a base portion configured for placement on a surface;

a cradle portion connected to the base portion, the cradle portion being configured to hold the mobile device in a position for reading a barcode;

a shield portion attached to the cradle portion;

a camera optic system within the shield portion, the camera optic system comprising at least one camera optic system lens that is at least partially aligned with the camera lens when the mobile device is held in the cradle portion of the presentation stand, the at least one camera optic system lens being configured to modify a field of view of the camera lens to provide a system field of view that is different in angular size from the field of view of the camera lens;

an illumination optic system within the shield portion, the illumination optic system being at least partially aligned with the first illumination source of the mobile device when the mobile device is held in the cradle portion; and one or more reflective surfaces that redirect an optical pathway of the system field of view from a first direction that does not intersect with a region of space where the barcode is located to a second direction that intersects with the region of space where the barcode is located.

11. The presentation stand of claim 10, wherein:

the illumination optic system comprises at least one illumination optic system lens that is at least partially aligned with the first illumination source of the mobile device when the mobile device is held in the cradle portion of the presentation stand, the at least one illumination optic system lens being configured to modify a first illumination field emitted by the first illumination source to provide a system illumination field with a system angular size that is different from an angular size of the first illumination field; and the one or more reflective surfaces are additionally configured to redirect the system illumination field from the first direction to the second direction.

12. The presentation stand of claim 10, wherein:

the illumination optic system comprises a target generating structure that is configured to shape a first illumination field emitted by the first illumination source into a targeting pattern when the mobile device is held in the cradle portion of the presentation stand; and the one or more reflective surfaces are additionally configured to redirect the targeting pattern from the first direction to the second direction.

13. The presentation stand of claim 10, wherein:

the illumination optic system comprises at least one illumination optic system lens that is at least partially aligned with the first illumination source of the mobile device when the mobile device is held in the cradle portion of the presentation stand, the at least one illumination optic system lens being configured to modify a first illumination field emitted by the first illumination source to provide a system illumination field with a system angular size that is different from an angular size of the first illumination field;

the mobile device further comprises a second illumination source;

the illumination optic system further comprises a target generating structure that is configured to shape a second illumination field emitted by the second illumination source into a targeting pattern when the mobile device is held in the cradle portion of the presentation stand; and the one or more reflective surfaces are additionally configured to redirect the system illumination field and the targeting pattern from the first direction to the second direction.

14. The presentation stand of claim 10, wherein:

the shield portion comprises a first chamber and a second chamber;

the camera optic system is housed in the first chamber;

the illumination optic system is housed in the second chamber; and the shield portion further comprises a barrier between the first chamber and the second chamber, the barrier being configured to optically isolate the first chamber from the second chamber such that illumination from the first illumination source does not enter the camera without first reflecting from an object within the system field of view.

15. The presentation stand of claim 10, further comprising:

an arm extending substantially upward from the base portion;

a first connector that is positioned within the cradle portion and that is configured to be connected to the mobile device;

a second connector that is configured to be connected to a power source; and a cable that connects the first connector to the second connector and that extends through at least a portion of the arm.

16. A system for reading barcodes, comprising:

a mobile device comprising a camera, a first illumination source, a processor, memory in electronic communication with the processor, and a barcode reading application stored in the memory;

a presentation stand comprising a base portion configured for placement on a surface, a cradle portion connected to the base portion, and a shield portion attached to the cradle portion;

a camera optic system within the shield portion, wherein the camera optic system is at least partially aligned with the camera of the mobile device when the mobile device is held in the cradle portion, wherein the camera optic system and the camera define a barcode reading lens system, and wherein the barcode reading lens system has a system field of view that is different from a field of view of the camera;

an illumination optic system within the shield portion, wherein the illumination optic system is at least partially aligned with the first illumination source when the mobile device is held in the cradle portion; and one or more reflective surfaces that redirect an optical pathway of the system field of view from a first direction that does not intersect with a region of space where a barcode is located to a second direction that intersects with the region of space where the barcode is located;

wherein the barcode reading application is executable by the processor to activate the first illumination source in response to detecting the barcode within the system field of view.

17. The system of claim 16, wherein:

the illumination optic system comprises at least one illumination optic system lens that is at least partially aligned with the first illumination source of the mobile device when the mobile device is held in the cradle portion of the presentation stand, the at least one illumination optic system lens being configured to modify a first illumination field emitted by the first illumination source to provide a system illumination field with a system angular size that is different from an angular size of the first illumination field; and the one or more reflective surfaces are additionally configured to redirect the system illumination field from the first direction to the second direction.

18. The system of claim 16, wherein:

the illumination optic system comprises a target generating structure that is at least partially aligned with the first illumination source when the mobile device is held in the cradle portion of the presentation stand, the target generating structure being configured to shape a first illumination field emitted by the first illumination source into a targeting pattern; and the one or more reflective surfaces are additionally configured to redirect the targeting pattern from the first direction to the second direction.

19. The system of claim 16, wherein:

the illumination optic system comprises at least one illumination optic system lens that is at least partially aligned with the first illumination source of the mobile device when the mobile device is held in the cradle portion of the presentation stand, the at least one illumination optic system lens being configured to modify a first illumination field emitted by the first illumination source to provide a system illumination field with a system angular size that is different from an angular size of the first illumination field;

the mobile device further comprises a second illumination source;

the illumination optic system further comprises a target generating structure that is at least partially aligned with the second illumination source when the mobile device is held in the cradle portion of the presentation stand, the target generating structure being configured to shape a second illumination field emitted by the second illumination source into a targeting pattern; and the one or more reflective surfaces are additionally configured to redirect the system illumination field and the targeting pattern from the first direction to the second direction.

20. The system of claim 16, wherein the presentation stand further comprises:

an arm extending substantially upward from the base portion;

a first connector that is positioned within the cradle portion and that is configured to be connected to the mobile device;

a second connector that is configured to be connected to a power source; and a cable that connects the first connector to the second connector and that extends through at least a portion of the arm.

* * * * *